United States Patent [19]
Yasinavichjus et al.

[11] 4,245,269
[45] Jan. 13, 1981

[54] MAGNETIC HEAD AND METHOD OF FABRICATING THE SAME

[76] Inventors: Rimvidas P. Yasinavichjus, ulitsa Vyarkju, 20, kv. 60; Vladimir I. Trufanov, ulitsa Zhirmunu, 52, kv. 30; Auxutis A. Yakshtas, ulitsa Krylova, 4, kv. 10; Jury S. Epishkin, ulitsa Vershulishkju, 73, kv. 37; Vladimir V. Rakov, ulitsa Varpu, 2, kv. 1, all of Vilnjus, U.S.S.R.

[21] Appl. No.: 885,025

[22] Filed: Mar. 8, 1978

[30] Foreign Application Priority Data

Mar. 15, 1977 [SU] U.S.S.R. ............... 2457120[I]
May 3, 1977 [SU] U.S.S.R. ............... 2481799

[51] Int. Cl.$^3$ ............... G11B 5/12; G11B 5/22
[52] U.S. Cl. ............... 360/125; 360/122
[58] Field of Search ............... 360/125, 126, 127, 122

[56] References Cited

U.S. PATENT DOCUMENTS

| | | | |
|---|---|---|---|
| 2,868,889 | 1/1959 | Patterson | 360/125 |
| 2,902,544 | 9/1959 | Barry | 360/126 |
| 2,931,864 | 4/1960 | Moehring et al. | 360/125 |

*Primary Examiner*—Robert S. Tupper
*Attorney, Agent, or Firm*—Haseltine and Lake

[57] ABSTRACT

A magnetic head comprising half-cores separated by a non-magnetic layer forming a working gap of the head. The line of intersection of the outer faces of the half-cores and the working surface of the magnetic head is represented by a smoothly varying curve characterized by a specific function causing a monotonically decreasing variation of the integral magnetic conductivity along the generating line of the working surface of the head as measured from the plane of the working gap of the head. In accordance with a method of fabricating the magnetic head, each half-core is machined by a shaped abrasive wheel so as to remove a portion of the body of the half-core in the zone where it is aligned with the working surface of the magnetic head on the side opposite the plane of the working gap of the head. The axis of revolution of the abrasive wheel is caused to move reciprocally at a certain angle to the plane of the working gap and is displaced during each such reciprocal pass by the cutting depth towards the half-core. The recesses formed in the course of removal of the portion of the body of each half-core are filled with a non-magnetic adhesive material.

5 Claims, 12 Drawing Figures

MAGNETIC HEAD AND METHOD OF FABRICATING THE SAME

FIELD OF THE INVENTION

The invention relates to magnetic recording, and more particularly to a magnetic head and a method of fabricating the same.

The invention is suitable for magnetic recording devices and can provide high-quality audio signals obtained without distortion during reproduction of sound information stored on a magnetic carrier, within the entire range of wavelengths being reproduced.

PRIOR ART

Known in the art is a magnetic head (cf. Japanese Pat. No. 20,676, Cl. 102E5, Published Oct. 7, 1963) comprising half-cores separated by a layer of non-magnetic material used to form the working gap of the magnetic head, wherein the distances, as measured at either side confronting the working gap between the points lying on the length thereof in the planes that pass through that length at right angles to the plane of the working gap and the points on the line of intersection of the outer faces of the half-cores and the working surface of the magnetic head, are different.

The line of intersection of the outer faces of the half-cores and the working surface of the described magnetic head is represented by a broken line which is formed by different lengths of plates of which the half-cores of the magnetic head are composed.

When a sound record stored on a magnetic carrier is reproduced by the known magnetic head, said record being positioned at right angles to the plane of the working gap during its movement over the working surface of the magnetic head, the magnetic flux enters the half-cores of the head through that portion of each plate of each half-core which co-operates magnetically with the sound record.

Since the working portion and, consequently, a respective area of magnetic interaction are each of a specific value for each plate, then the reproduction of long waves of a sound record involves different phase relationships of the magnetic flux being reproduced and the resulting wave pattern ensures a reduced non-linearity of the frequency replay response of the magnetic head so that the so-called "ripple" is decreased.

The stepwise variation of the distances between the plane of the working gap of the magnetic head and the points lying on the line of intersection of the outer faces of the half-cores and the working surface of the magnetic head results, however, in the non-linearity of the frequency replay response at medium wavelengths since an intense superposition takes place. On the other hand, a sudden breakage of the magnetic conductivity of the pair "carrier-head", related to the thickness of a single plate, is responsible for a considerable non-linearity of the frequency replay response at long wavelengths for the most distant, relative to the plane of the working gap, portions of the line of intersection of the outer faces of the half-cores and the working surface of the magnetic head.

As a result the known magnetic head features a frequency response in the long wavelengths range which is not suitable for high-quality tape recorders.

Since the known magnetic head cannot provide for a sufficient improvement of its frequency response at long wavelengths this requires that the distance between the plane of the working gap and the line of intersection of the outer faces of the half-cores and the working surface of the magnetic head be increased as much as possible in order to decrease the "ripple"; this leads, however, to an increase in the overall size of the magnetic head.

A method of fabricating the known magnetic head is known, which method comprises joining together the half-cores of the magnetic head with a layer of non-magnetic material between the half-cores so as to form the working gap of the magnetic head and a further mechanical treatment of the working surface of the magnetic head.

The operation steps of the known method are as follows.

A certain number of plates of magnetically soft material produced, for example, by stamping are assembled to form a stack and are fixed to each other by cementing or other conventional method. The portion of each plate which is adapted to be aligned with the working surface of the magnetic head has a specific length. After the conforming surfaces of the half-cores so produced have been processed, the half-cores are brought together with a layer of non-magnetic material, i.e. a non-magnetic shim according to the method, between them so as to form the working gap of the magnetic head; a winding is then mounted on the half-cores.

After the half-cores have been mounted in a body or a shield member of the magnetic head and fixed with the help of an adhesive compound, the working surface of the head and the assembled half-cores as well are treated mechanically. The known method is disadvantageous since a plurality of plates is to be used for fabrication of each half-core; said plates differ from one another in that their portions to be aligned with the working surface of the magnetic head have different lengths. Therefore, the plates can be manufactured using a number of stamps, whereas each plate must be treated additionally when a single stamp is used for manufacture of the plates. In both cases, methods of fabricating the half-cores are sophisticated and costly. Moreover, the plates are difficult to assemble to form a stack since one must continuously check to see that plates obtained from different stamps are assembled according to a certain sequence. Also, other errors are introduced due to the fact that no identical plates can be manufactured using different stamps, which deteriorates the quality of the finished magnetic head.

SUMMARY OF THE INVENTION

An object of the invention is to provide a magnetic head having a minimal-non-linearity of its frequency replay response at long and medium wavelengths.

Another object of the invention is to provide a magnetic head whose frequency replay response is maintained stable during operation.

Still another object of the invention is to provide a method of fabricating the proposed magnetic head, which method can provide a magnetic head of a smaller overall size without deterioration of its frequency replay response at long and medium wavelengths.

The invention therefore seeks to achieve a magnetic head comprising half-cores separated by a layer of non-magnetic material so as to form the working gap of the magnetic head, wherein the distances, as measured at either side confronting the working gap between the points lying on the length thereof in planes that pass through that length at right angles to the plane of the working gap and the points on the line of intersection of the outer faces of the half-cores and the working surface of the magnetic head, are different, in which magnetic head, according to the invention, there exists the line of intersection of the outer faces of the half-cores and the working surface of the magnetic head, said line being represented by a smoothly varying curve which is characterized by a function which causes a monotonically decreasing variation of the integral magnetic conductivity measured along the generating line of the working surface of the magnetic head from the plane of the working gap of the magnetic head.

Preferably, the line of intersection of the outer faces of the half-cores and the working surface of the magnetic head, represented by a smoothly varying curve which is characterized by a specific function, is located in close proximity to a magnetic carrier when a sound record stored on it is reproduced.

It is advantageous that the lines of intersection of the outer faces of both the half-cores and the working face of the magnetic head, represented by smoothly varying curves which are characterized by a specific function, are located symmetrically relative to the plane of the working gap of the magnetic head.

It is preferable that the lines of intersection of the outer faces of both the half-cores and the working face of the magnetic head, represented by smoothly varying curves which are characterized by a specific function, are also located symmetrically relative to the mid line of the half-cores which is perpendicular to the plane of the working gap of the magnetic head.

Preferably, in a stereo replay magnetic head there exist lines of intersection of the outer faces of two pairs of half-cores and the working surface of the magnetic head, represented by smoothly varying curves which are characterized by a specific function, and the lines of interaction are located symmetrically relative to the mid plane of the two pairs of half-cores which is perpendicular to the plane of the working gap of the magnetic head, so that the distance between the symmetrical curves is increased as they extend from the plane of the working gap.

Advantageously, the smoothly varying curve characterized by a specific function is a bell-shaped curve.

Preferably, the smoothly varying curve characterized by a specific function is an exponential curve.

It is advantageous that the smoothly varying curve characterized by a specific function is a straight line.

According to the invention there is further provided a method of fabricating said magnetic head, wherein the half-cores of the magnetic head with a layer of non-magnetic material between said half-cores to form the working gap of the magnetic head are brought together and the working surface of the magnetic head is then treated mechanically, which method comprises the following steps: each half-core is machined by a shaped abrasive wheel so as to remove a portion of the body of the half-core in the zone where it is aligned with the working surface of the magnetic head on the side opposite the plane of the working gap of the magnetic head, the axis of revolution of said abrasive wheel being caused to move reciprocally at a certain angle to the plane of the working gap and being displaced during each such reciprocal pass towards the half-core by the cutting depth, and the recesses formed in the course of the removal of said portion of the half-core being filled with a non-magnetic adhesive material.

The construction of the magnetic head of the invention obtained in accordance with the proposed method provides for a linear frequency replay response of the head at long and medium wavelengths, for a smaller overall size of the head without deterioration of its operational characteristics and for simpler fabrication techniques which enable, in turn, the manufacture of highly effective magnetic heads on an industrial basis which would be used in magnetic recording devices.

BRIEF DESCRIPTION OF THE DRAWINGS

Other features and advantages of the invention will appear from the following description of preferred embodiments thereof in conjunction with the accompanying drawings in which.

DETAILED DESCRIPTION

The magnetic head of the invention fabricated by the proposed method comprises a body member 1 (FIG. 1) whose slots accomodate a pair of half-cores 2, 3 incorporating plates 4 made of a magnetically soft material and separated by a layer of non-magnetic material (a non-magnetic shim is used according to the invention) to form a working gap 5 of the magnetic head. The remaining slots in the body member 1 are filled with a non-magnetic adhesive material (an epoxy resin compound according to the invention).

Figure 1:
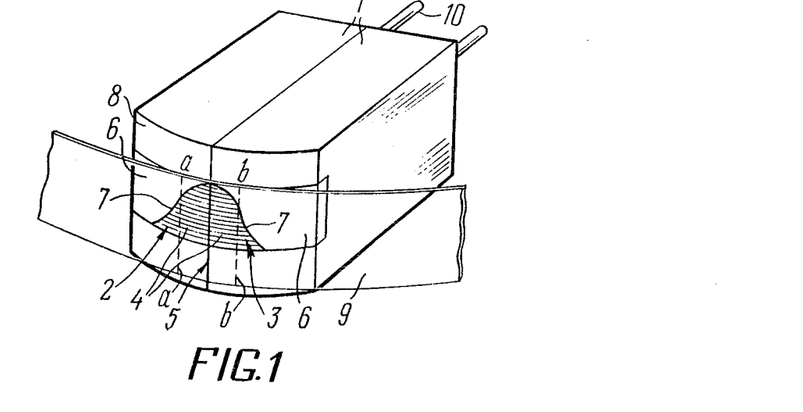
FIG. 1 is a front perspective view of a magnetic head fabricated by the proposed method, according to the invention.

The distances, as measured at either side confronting working gap between the points lying on the length thereof in the planes that pass through that length at right angles to the plane of the working gap and points on a line of intersection 7 of the outer faces of the half-cores 2, 3 and a working surface 8 of the magnetic head, are different. The line of intersection 7 is represented by a smoothly varying curve characterized by a function which causes a monotonically decreasing variation of the integral magnetic conductivity measured along the generating line of the working surface 8 from the plane of the working gap 5.

The line of intersection 7, represented by the smoothly varying curve which is characterized by a specific function, is located in close proximity to a magnetic carrier 9 (the zone extending from a to b) when sound information stored on it is reproduced.

In the described embodiment of the magnetic head, the lines of intersection 7 of the outer faces of the half-cores 2, 3 and the working surface 8 of the magnetic head, represented by smoothly varying curves which are characterized by a specific function, are located symmetrically relative to the plane of the working gap 5 of the magnetic head. Each of said curves is a bell-shaped curve hereinafter referred to as bell-shaped curve 7.

Terminals 10 coupled to a winding (not shown) on the half-cores 2, 3 are embedded in the body member 1.

In another embodiment of the magnetic head (FIG. 2), lines of intersection 11 of the outer faces of the half-cores 2, 3 and the working surface 8 of the magnetic head, represented by smoothly varying curves which are characterized by a specific function, are also located symmetrically relative to a mid line 12 of the half-cores 2, 3 which is perpendicular to the plane of the working gap 5 of the magnetic head. Each of said curves is a bell-shaped curve hereinafter referred to as bell-shaped curve 11.

Figure 3:
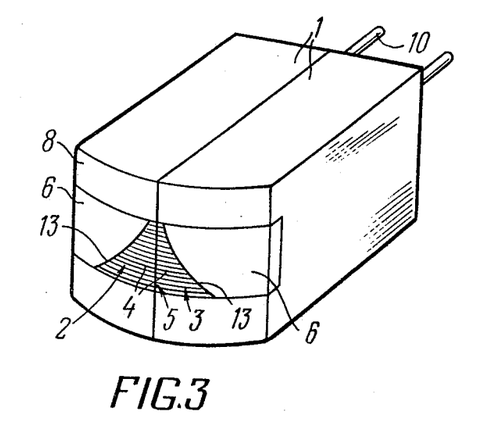
FIG. 3 is a front perspective view of still another embodiment of a magnetic head fabricated by the proposed method, according to the invention.

In the embodiment of the magnetic head of FIG. 3, a smoothly varying curve characterized by a specific function is an exponential curve 13.

Figure 4:
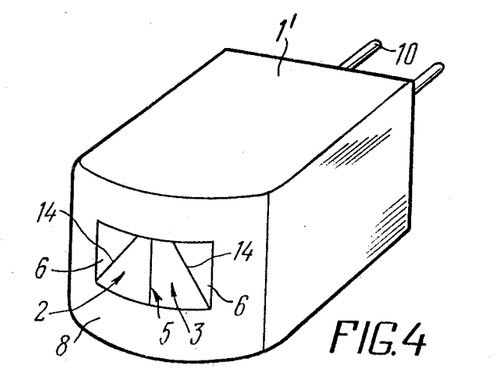
FIG. 4 is a front perspective view of another embodiment of a magnetic head fabricated by the proposed method, according to the invention.

In the embodiment of the magnetic head of FIG. 4, a smoothly varying curve characterized by a specific function is a straight line 14 when viewed as a projection on to a frontal plane. Here, the half-cores 2, 3 made of one-piece blanks of a hot-pressed ferrite (or a cast-in magnetically soft alloy belonging to Fe-Al alloys) are set in a shield member 1' of the magnetic head, a layer of non-magnetic material to form the working gap 5 of the magnetic head being made of glass in this case.

Figure 5:
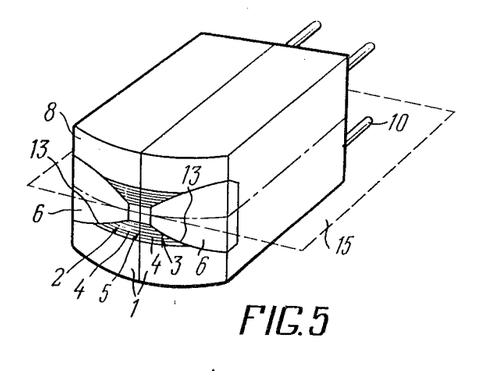
FIG. 5 is a front perspective view of a stereo magnetic replay head fabricated by the proposed method, according to the nvention.

In the stereo magnetic replay head of FIG. 5, which is practically a doubled arrangement of the head of FIG. 3, the lines of intersection of the outer faces of two pairs of the half-cores 2, 3 and the working surface 8 of the magnetic head represented by exponential curves 13 (the other types of curves mentioned above are also possible) are located symmetrically relative to a mid plane 15 of the two pairs of the half-cores 2, 3 which is perpendicular to the plane of the working gap 5 of the magnetic head, so that the distance between the symetrical curves 13 is increased as they extend from the plane of the working gap 5.

The proposed method of fabricating the magnetic head of the invention will now be described.

The half-cores 2, 3 of the magnetic head of FIG. 1 are obtained by assembling plates 4 of magnetically soft material in a stack, said plates 4 being fabricated using, for example, a stamping method. When stacked, the plates 4 are fixed to one another using, for example, a cement. The half-cores 2, 3 thus obtained are provided with a winding 16 (FIG. 6) and are then set in the slots in the body member 1. A joining plane 17 of each of the half-cores 2, 3, which coincides with the plane of the working gap 5 (FIG. 1), is treated thoroughly and the half-cores 2, 3 in the body member 1 are joined together with a layer of non-magnetic material (a non-magnetic shim according to the method) placed therebetween to form the working gap 5; a further mechanical treatment of the working surface 8 of the magentic head is accomplished, for example, by means of an abrasive wheel.

Figure 6:
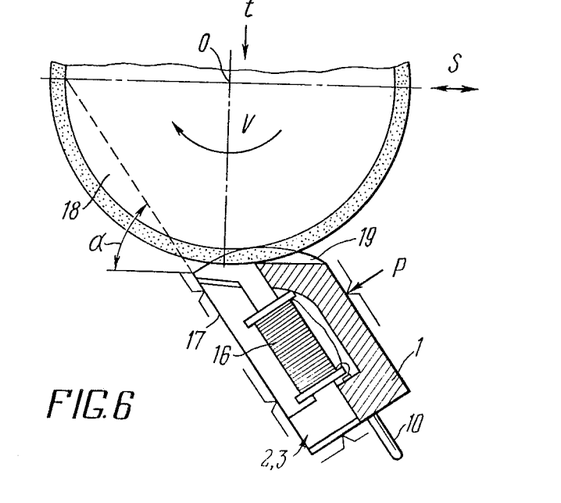
FIG. 6 is a longitudinal section through a half-core with a body member of the magnetic head of FIG. 1.

Prior to mechanical treatment of the working surface 8, each of the half-cores 2, 4 (FIG. 6) is machined by a shaped abrasive wheel 18 so as to remove a portion of the body of the half-core in the zone where it is aligned with the working surface 8 (FIG. 1) on the side opposite the plane of the working gap 5; in this case, the axis of revolution (FIG. 6) of the abrasive wheel 18, designated as 0, is caused to move reciprocally at an angle $\alpha$ to the plane of the working gap 5 and to be displaced during each such reciprocal pass towards the half-core by the cutting depth of t, cavities or recesses 19 formed in the course of the removal of said portion of the half-core being filled with a non-magnetic adhesive material 6 (FIG. 1), which is an epoxy resin compound in this case. For this operation, the half-cores 2, 3 (FIG. 6) in the body member 1 are fixed in a fixture (not shown), with a force P applied as shown in FIG. 6; said fixture is installed, for example, on the table of a tool-grinding machine (not shown) so that the angle $\alpha$ between the joining plane 17 coinciding with the plane of the working gap 5 (FIG. 1) and the direction of reciprocating motion of the axis of revolution 0 (FIG. 6) of the shaped abrasive wheel 18 is from 30° to 65° depending on the design features of the magnetic head. Note that the profile of the abrasive wheel 18 (FIG. 6) is determined by a curve with a certain radius of curvature in order to obtain the line of intersection of the outer faces of the half-cores 2, 3 (FIG. 1) and the working surface 8 of the magnetic head characterized by a specific function and represented by the bell-shaped curve 7.

During a further operational step, the abrasive wheel 18, which is caused to rotate at a speed equal to 20 to 30 m/s, is fed to the half-cores 2, 3. At the same time, the axis of revolution 0 of the abrasive wheel 18 is caused to move reciprocally at a speed S equal to 10 to 20 m/min. After the moment of making contact between the abrasive wheel 18 and the half-cores 2, 3, and the body member 1 as well, the wheel 18 is moved towards the surfaces being machined by 0.01 to 0.05 mm (cutting depth t) during each reciprocal pass.

The recesses 19 formed during the machining are filled, for example, with drops of an epoxy resin compound, which is then subjected to a heat treatment.

Figure 7:
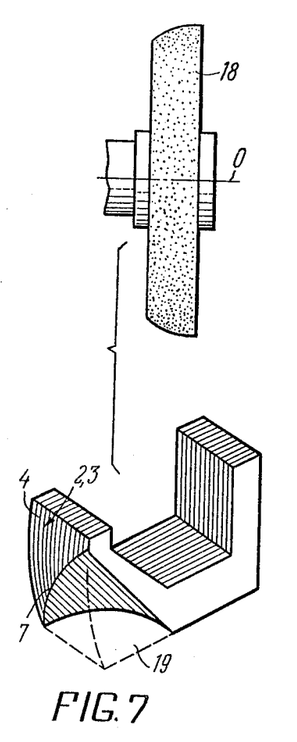
FIG. 7 is a perpespective view of the half-cores of the magnetic head of FIG. 1, a shaped abrasive wheel being shown, according to the invention.

The magnetic head of FIG. 1 can be obtained by machining the half-cores 2, 3 (FIG. 7) by means of the shaped abrasive wheel 18 on the side opposite the plane of the working gap 5 before they are set in the body member 1. In this case, the bell-shaped curve 7 is generated as a bounding edge of the recess during the machining.

Figure 2:
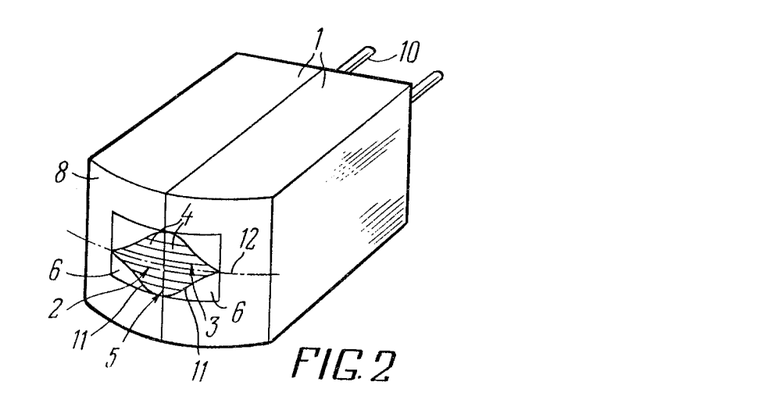
FIG. 2 is a front perspective view of another embodiment of the magnetic head of FIG. 1, according to the invention.
Figure 8:
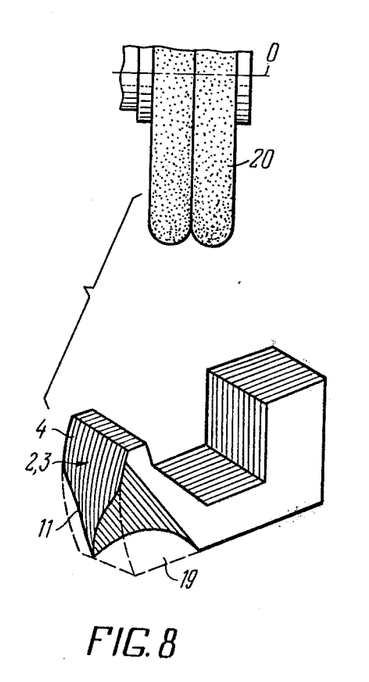
FIG. 8 is a perspective view of the half-cores of the magnetic head of FIG. 2, a shaped abrasive wheel of another construction being shown, according to the invention.

The magnetic head of FIG. 2, in which the lines of intersection 11 of the outer faces of the half-cores 2, 3 and the working surface 8 of the magnetic head, represented by smoothly varying curves (namely, the bell-shaped curves 11), are located symmetrically relative to the mid line 12 of the half-cores 2, 3, can be produced in a manner analogous to that described for the embodiment of FIG. 6. Here, the half-cores 2, 3 (FIG. 8) are machined by a shaped abrasive wheel 20 on the side opposite the plane of the working gap 5. The wheel 20, which is a double wheel having a double-radius working surface, is used to machine each of the half-cores 2, 3, i.e., each side of the half-core in succession, or both sides of the half-core concurrently, with the result that symmetrical bell-shaped curves 11 are generated.

Figure 9:
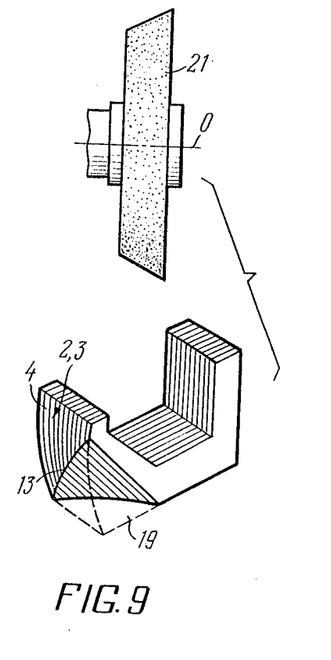
FIG. 9 is a perspective view of the half-cores of the magnetic head of FIG. 3, a shaped abrasive wheel of still another construction being shown, according to the invention.

The magnetic head of FIG. 3, in which the line of intersection of the outer face of each of the half-cores 2, 3 and the working surface 8 of the magnetic head is the exponential curve 13 (FIG. 9), is produced in a manner analogous to that described for the embodiment of FIG. 6. In this case, the profile of an abrasive wheel 21 is a straight line.

Figure 10:
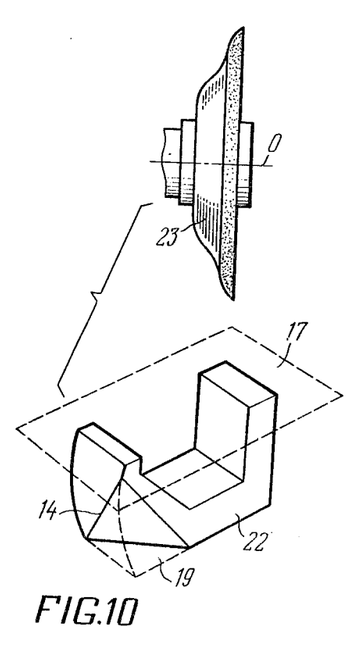
FIG. 10 is a perspective view of a blank for a half-core of the magnetic head of FIG. 4, said blank being formed of a single piece of material and machined by the proposed method, and a shaped abrasive wheel used to machine the blank being shown, according to the invention.
Figure 11:
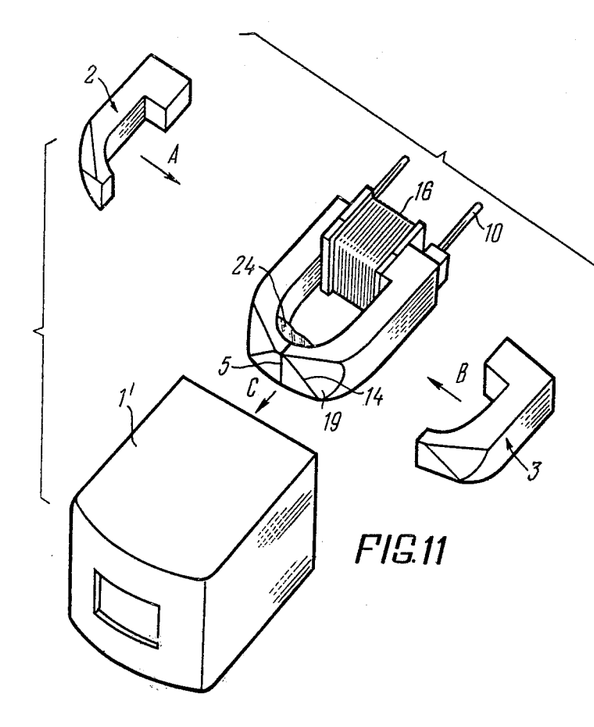
FIG. 11 is an exploded perspective view of the half-cores of the magnetic head of FIG. 4, said half-cores being brought together and separated by a layer of a non-magnetic material, a winding mounted on said half-cores and a shield member of the head being shown, according to the invention.

The embodiment of the magnetic head of FIG. 4, wherein the line of intersection of the outer face of each of the half-cores 2, 3 and the working surface 8 of the magnetic head is the straight line 14 (FIG. 10) as viewed as a projection onto a frontal plane, is obtained as follows. Here, one-piece half-cores 2, 3 made, for example, of a hot-pressed ferrite (or a magnetically soft alloy belonging to Fe-Al alloys) are used. A blank 22 of each of the half-cores 2, 3 is machined on the side opposite the plane of the working gap 5 (FIG. 4) by a shaped abrasive wheel 23 (FIG. 10) in a manner analogous to that described for the magnetic head of FIG. 6. The profile of the wheel 23 is a semi-circle whose radius is equal to the radius of the working surface 8 (FIG. 4). Then, the joining plane 17 (FIG. 6) of each of the half-core 2, 3 coinciding with the plane of the working gap 5 (FIG. 4) is machined and the half-cores 2, 3 are brought together (as indicated by arrows A and B in FIG. 11) with a layer of non-magnetic material, for example, a glass plate 24 placed therebetween to form the working gap 5. Thereafter, a winding 16 is wound on the half-cores 2, 3 and the assembly so obtained is set in a hollow cover member 1' of the magnetic head (as indicated by arrow C).

The non-magnetic adhesive material 6 (FIG. 4) for example, an epoxy resin compound, fills the recesses 19 formed during the machining of the magnetic head as well as the inner free space of the cover member 1'. The working surface 8 of the completed magnetic head is then machined.

Figure 12:
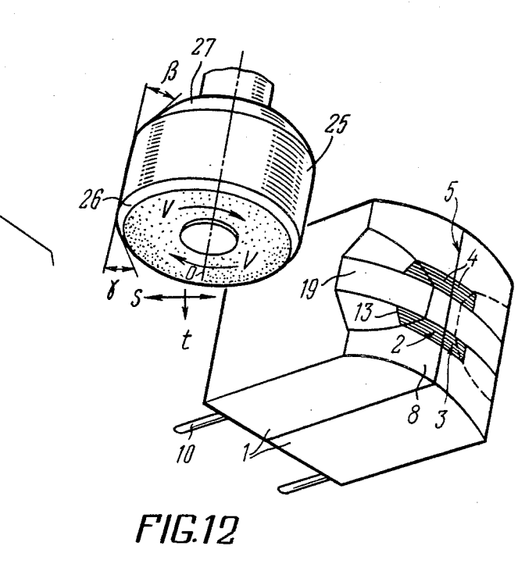
FIG. 12 is a perspective view of the stereo magnetic replay head of FIG. 5, a shaped abrasive wheel being shown, according to the invention.

In the stereo magnetic replay head of FIG. 5 there are the lines of intersection of two pairs of the half-cores 2, 3 and the working surface 8 of the magnetic head which are smoothly varying curves, namely, the exponential curves 13. This head is manufactured in a manner analogous to that described for the head of FIG. 6 with the exception that a shaped abrasive wheel 25 is used to machine concurrently the two pairs of the half-cores 2, 3 (FIG. 12); the wheel 25 has double-ended cutting adges 26, 27 with straight chamfers at identical angles $\beta$ and $\gamma$ to the axis of revolution of the wheel 25. The optimum value of the angle $\beta$ or $\gamma$ is 45°. FIG. 12 illustrates an example in which the half-cores 2, 3 are machined by the shaped abrasive wheel 25 after the parts of the body member 1 with the half-cores 2, 3 already set in its slots have been joined and fixed together. The resulting exponential curves 13 are characterized by the fact that the distance between them is increased as they extend from the plane of the working gap 5.

The operation of the magnetic head of FIG. 1 fabricated by the method proposed is as follows. After the head has been installed in a magnetic recording device (not shown), the terminals 10 of the head are connected to the amplifier. The track with sound information stored on the magnetic carrier 9 is oriented, for reproduction, at right angles to the plane of the working gap 5. With a full mechanical contact established between the magnetic carrier 9 and the working surface 8, the zone defined by dotted lines a and b (FIG. 1), which is the zone of the magnetic conductivity of the "carrier-head", is determined completely by the configuration of the working portion of the half-cores 2, 3 which coincides with the working surface 8 of the magnetic head and makes direct contact with the magnetic carrier 9. As the line of intersection 7 of the outer faces of the half-cores 2, 3 and the working surface 8 of the magnetic head approaches the plane of the working gap 5 through its length, the sound information distributed evenly over the entire width of the track on the magnetic carrier 9 is gradually involved in magnetic interaction with the half-cores 2, 3 in the body member 1 of the magnetic head.

Due to a smooth variation of the distance from the working gap 5 to the line of intersection 7, the above magnetic interaction rises and attenuates monotonically, which results in a mutual concellation of unwanted signals generated during reproduction of wave patterns whose wavelengths are commensurate with the size of the half-cores 2, 3 as measured along the record. Therefore, the superposition of long wavelengths attenuates abruptly with the result that the "ripple" is decreased and the linearity of the frequency replay response of the magnetic head is increased.

An analysis of magnetic interaction of the "carrier-head" shows that the wave processes taking place on the working surface 8 of the magnetic head are determined by the variation of the reluctance of the half-cores 2, 3 along the direction of the movement of the carrier 9, which variation depends, in this case, on the variation of the height of the working portion of the half-cores 2, 3.

In order to obtain a smooth frequency response having no "ripple", it is necessary for the line of intersection of the outer faces of the half-cores 2, 3 and the working surface 8 to be represented by a smoothly varying curve which may be determined by one of the following functions: bell-shaped (FIG. 1), exponential (FIG. 3), and linear (FIG. 4). Such a curve causes a monotonically decreasing variation of the integral magnetic conductivity along the generating line of the working surface 8 of the magnetic head as the curve extends from the plane of the working gap 5.

Since the lines of intersection (the curves 7, 11, 13, 14 in FIGS. 1–5) of the outer faces of the half-cores 2, 3 and the working surface 8 are located in close proximity to the magnetic carrier 9 storing sound information, the overall size of the magnetic replay head can be reduced so that the "ripple" of the frequency response of the head is not changed at long wavelengths.

The invention therefore provides for a decrease in the length of the working surface 8 which is practically commensurate with the wavelengths being reproduced, which helps reduce the overall size of the magnetic head.

During operation, the working surface 8 of the magnetic head is subjected to wear, but the configuration of the curves 7, 11, 13, 14 is maintained invariable with the result that the frequency response of the magnetic head at long and medium wavelengths also does not change.

The symmetrical position of the lines of intersection of the outer faces of the half-cores 2, 3 and the working surface 8 provides for a magnetic head which is immune to the influence of unwanted external magnetic fields. Due to a symmetrical magnetic interaction between the half-cores 2, 3 and the magnetic carrier 9 there results a condition in which the component of an unwanted magnetic field, which is parallel to the plane of the working gap 5, produces e.m.f.s. in the halves of the winding 16 (FIG. 6) having equal values and opposite signs. In addition, the symmetrical position of the working portions of the half-cores 2, 3 with respect to the plane of the working gap 5 ensures conditions under which no phase distortion occurs during reproduction.

Since the lines of intersection of the outer faces of the half-cores 2, 3 (FIG. 2) and the working surface 8 of the magnetic head, represented by the smoothly varying curves 11, are symmetrical with respect to the mid line 12 of the half-cores 2, 3 which is perpendicular to the plane of working gap 5, this causes the distance between the half-cores 2,3 and successive records located on the confronting sides of the half-cores 2, 3 to vary gradually; this provides for a decreased crosstalk between adjacent records in the case of multi-track (.e.g. quadraphonic) magnetic heads. In addition, the above symmetrical position of the curves tends to reduce unwanted amplitude modulation during reproduction.

In the stereo magnetic replay head of FIG. 5, there are the lines of intersection of the outer faces of two pairs of the half-cores 2, 3 and the working surface 8, represented by the smoothly varying curves 13 and located symmetrically with respect to the mid plane 15 of the two half-cores 2, 3 which is perpendicular to the plane of the working gap 5, so that the distance between the symmetrical curves 13 is increased as they extend from the plane of the working gap 5 on either side thereof. This results in a much simpler design of the head since the above curves 13 can be generated concurrently on the two half-cores 2, 3 by means of a single shaped abrasive wheel 25. In addition, the crosstalk from the track stored on the magnetic carrier 9 between the two half-cores 2, 3 of the head is reduced.

As stated above, the lines of intersection (the curves 7, 11, 13, 14 in FIGS. 1-5) of the outer faces of the half-cores 2, 3 and the working surface 8 of the magnetic head are determined by specific functions which cause a monotonically descreasing variation of the integral magnetic conductivity as measured along the generating line of the working surface 8 and are represented by the following curves: a bell-shaped curve; an exponential curve; a curve whose projection onto a frontal plane is a straight line; and a curve which resembles one of the curves mentioned above. The required type of the curve is chosen according to the required accuracy of the frequency response of the head and also depends on the degree of sophistication of fabrication methods employed and on the kind of processing equipment available.

The bell-shaped curve 7 (FIG. 1) makes it possible to eliminate to the fullest extent the non-linearity of the frequency response of the head at long wavelengths. It is very difficult, however, to obtain such a curve with a required degree of accuracy.

The exponential curve 13 (FIG. 3) provides for a considerable decrease in the non-linearity of the frequency response of the head which nevertheless features in this case a minimum overall size. The curve 13 must be generated with a greater accuracy since processing errors in the vicinity of the plane of the working gap 5 do not allow for a considerable decrease in the non-linearity of the frequency response at the medium wavelengths being reproduced.

The curve whose projection onto a frontal plane is the straight line 14 (FIG. 4) provides for an increase in the long wavelength range of the frequency response. Such increase can be used in some cases for correction of the low-frequency range of the frequency response. In addition, the curve is easy to produce.

The advantage of the magnetic head of the invention and the method of fabricating the same is that the half-cores of the head can be formed of one-piece blanks of a hot-pressed ferrite or cast-in magnetically soft alloy from among Fe-Al alloys.

The magnetic head of the invention has the following electrical and acoustic characteristics attainable on the basis of a present-day technology:

sensitivity: 0.6 $\mu$V at 200 $\mu$H;
crosstalk between adjacent tracks of stereo magnetic replay head: 40 dB per 80 Hz at 19.05 cm/s;
crosstalk between adjacent heads: 70 dB per 100 Hz;
frequency response: 31.5 to 16.000 Hz at 9.53 cm/s;
minimum ripple of frequency response: ±1 dB.

Moreover, the objects of the invention are attained by means of simple equipment and fixtures and require considerably simpler fabrication techniques as compared with the prior art.

What is claimed is:

1. A magnetic head comprising:
   first and second half-core members, said half-core members each including a front face, and four side faces perpendicular thereto;
   a non-magnetic layer;
   said first and second half-core members being assembled together with respective ones of said side faces adjacent one another and with said non-magnetic layer interposed therebetween to from a front working surface of the head with a planar working gap therein;
   at least one winding mounted on said first and second half-core members;
   said front faces of said first and second half-core member cooperatively defining said front working surface, said half-core members each being provided with a cavity extending in part in said front face, in one of said side surfaces adjacent to and in the side face remote from the side face forming said gap, said cavity having a bounding edge at said front face which constitutes the edge of said front working surface, said bounding edges of each of said core halves combining to form a bell-shaped curve symmetrically disposed about the plane of said working gap;
   a hollow cover member having at least one slot which receives said first and second half-core members, said slot extending beyond said bounding edges to expose said front surfaces of said half-core members beyond said bounding edges,
   a non-magnetic adhesive material filling said cavities and forming a continuous surface with said front working surface which is exposed through said slot; and
   terminals mounted in said hollow member and electrically coupled to said winding.

2. A magnetic head as claimed in claim 1 wherein each core half is further provided with a second cavity extending in part in said front face, in the other of said one surfaces adjacent to and in the side face remote from the side face forming said gap, said second cavity having a bounding edge at said front face which constitutes an edge of said front working surface, said bounding edges of each core half combining to form a bell-shaped curve symmetrically disposed about the plane of said working gap and, said bounding edges of said front faces of said first and second half-core members are located symmetrically with respect to a mid line of said half-core members which is perpendicular to said plane passing through said working gap of the magnetic head.

3. A magnetic head comprising:
first and second half-core members, said half-core members each including a front face, and four side faces perpendicular thereto;
a non-magnetic layer;
said first and second half-core members being assembled together with respective ones of said side faces adjacent one another and with said non-magnetic layer interposed therebetween to form a front working surface of the head with a planar working gap therein;
at least one winding mounted on said first and second half-core members;
said front faces of said first and second half-core members cooperatively defining said front working surface, said half-core members each being provided with a cavity extending in part in said front face, in one of said side surfaces adjacent to and in the side face remote from the side face forming said gap, said cavity having a bounding edge at said front face which constitutes the edge of said front working surface, said bounding edges of each of said core halves forming an exponential curve about the plane of said working gap, with the curves being symmetrically disposed about the plane of the working gap;
a hollow cover member having at least one slot which receives said first and second half-core members, said slot extending beyond said bounding edges to expose said front surfaces of said half-core members beyond said bounding edges,
a non-magnetic adhesive material filling said cavities and forming a continuous surface with said front working surface which is exposed through said slot; and
terminals mounted in said hollow member and electrically coupled to said winding.

4. A magnetic head comprising:
first and second half-core members, said half-core members each including a front face, and four side faces perpendicular thereto;
a first non-magnetic layer;
said first and second half-core members being assembled together with respective ones of said side faces adjacent one another and with said first non-magnetic layer interposed therebetween to form a first front working surface of the head with a first planar working gap therein;
at least one winding mounted on said first and second half-core members;
third and fourth half-core members each including a front face and four side faces perpendicular thereto;
a second non-magnetic layer;
said third and fourth half-core members being assembled together with respective ones of said side faces adjacent one another and with said second non-magnetic layer interposed therebetween to form a second front working surface of the head with a second planar working gap therein, said first and second working gaps being aligned in a common plane, at least one further winding mounted on said third and fourth half-core members;
said front surfaces of said first and second half-core members and said third and fourth half-core members co-operatively defining said first and second front working surfaces, said half-core members each being provided with a cavity extending in part in said front face, in one of said side faces adjacent to and in that one of the side faces remote from the side face forming said respective gap, said cavity having a bounding edge at said front face which constitutes the edge of said respective front working surface, said respective bounding edges of said core halves combining to form bell-shaped curves symmetrically disposed about the plane of said respective working gap;
said bounding edges of said first, second, third and fourth half-core members being located symmetrically with respect to a mid plane of said first, second, third and fourth half-core members, said mid plane being perpendicular to said plane of said working gaps so that the distance between said symmetrical curves increases as said curves extend from the plane of the working gap;
a hollow cover member having at least two slots, said hollow member receiving said half-core members, said slots extending beyond said bounding edges to expose said front surfaces of said half-core members beyond said bounding edges;
a non-magnetic adhesive material filling said cavities and forming a continuous surface with said front working surface which is exposed through said slots; and
terminals mounted in said hollow member and electrically coupled to said windings.

5. A magnetic head comprising:
first and second half-core members, said half-core members each including a front face, and four side faces perpendicular thereto;
a first non-magnetic layer;
said first and second half-core members being assembled together with respective ones of said side faces adjacent one another and with said first non-magnetic layer interposed therebetween to form a first front working surface of the head with a first planar working gap therein;
at least one winding mounted on said first and second half-core members;
third and fourth half-core members each including a front face and four side faces perpendicular thereto;
a second non-magnetic layer;
said third and fourth half-core members being assembled together with respective ones of said side faces adjacent one another and with said second non-magnetic layer interposed therebetween to form a second front working surface of the head with a second planar working gap therein, said first and second working gaps being aligned in a common plane, at least one further winding mounted on said third and fourth half-core members;
said front surfaces of said first and second half-core members and said third and fourth half-core members co-operatively defining said first and second front working surfaces, said half-core members each being provided with a cavity extending in part in said front face, in one of said side faces adjacent to and in that one of the side faces remote from the side face forming said respective gap, said cavity having a bounding edge at said front face which constitutes the edge of said respective front working surface, said respective bounding edges of said core halves forming exponential curves about the plane of said respective working gap with the curves being symmetrically disposed about the plane of the respective working gap;

said bounding edges of said first, second, third and fourth half-core members being located symmetrically with respect to a mid plane of said first, second, third and fourth half-core members, said mid plane being perpendicular to said plane of said working gaps so that the distance between said symmetrical curves increases as said curves extend from the plane of the working gap;

a hollow cover member having at least two slots, said hollow member receiving said half-core members, said slots extending beyond said bounding edges to expose said front surfaces of said half-core members beyond said bounding edges;

a non-magnetic adhesive material filling said cavities and forming a continuous surface with said front working surface which is exposed through said slots; and terminals mounted in said hollow member and electrically coupled to said windings.

* * * * *